(12) United States Patent  
Hotes (10) Patent No.: US 9,121,192 B2  
(45) Date of Patent: Sep. 1, 2015

(54) SHADE SHELTER WITH SOLAR PANELS

(71) Applicant: California Industrial Facilities Resources, Inc., Kirkland, WA (US)

(72) Inventor: Douglas T. Hotes, Kirkland, WA (US)

(73) Assignee: California Industrial Facilities Resources, Inc., Kirkland, WA (US)

( * ) Notice: Subject to any disclaimer, the term of this patent is extended or adjusted under 35 U.S.C. 154(b) by 137 days.

(21) Appl. No.: 13/790,813

(22) Filed: Mar. 8, 2013

(65) Prior Publication Data

US 2013/0233364 A1    Sep. 12, 2013

Related U.S. Application Data

(60) Provisional application No. 61/608,590, filed on Mar. 8, 2012.

(51) Int. Cl.

| | |
|---|---|
| *E04H 15/02* | (2006.01) |
| *E04H 15/16* | (2006.01) |
| *E04H 15/14* | (2006.01) |
| *E04H 3/08* | (2006.01) |
| *E04H 15/36* | (2006.01) |
| *E04H 15/54* | (2006.01) |
| *H02S 20/23* | (2014.01) |
| *H02S 20/22* | (2014.01) |
| *F24J 2/52* | (2006.01) |

(52) U.S. Cl.
CPC .................. *E04H 15/02* (2013.01); *E04H 3/08* (2013.01); *E04H 15/14* (2013.01); *E04H 15/16* (2013.01); *E04H 15/36* (2013.01); *E04H 15/54* (2013.01); *H02S 20/22* (2014.12); *H02S 20/23* (2014.12); *F24J 2/5233* (2013.01); *F24J 2/5264* (2013.01); *Y02B 10/12* (2013.01)

(58) Field of Classification Search
CPC ......... E04H 15/02; E04H 15/16; E04H 15/36; Y20E 10/50; Y02B 10/12; Y02B 10/20; F24J 2/5203; E04D 13/18
USPC ....................... 135/91–94, 96, 121–122, 124, 135/156–158; 52/173.3, 200, 220.3, 537; 136/244, 245, 251; 126/623, 710
See application file for complete search history.

(56) References Cited

U.S. PATENT DOCUMENTS

| | | | | |
|---|---|---|---|---|
| 3,028,872 | A * | 4/1962 | Cresswell | 135/94 |
| 4,667,692 | A * | 5/1987 | Tury et al. | 135/156 |
| 5,090,171 | A * | 2/1992 | Kano et al. | 52/243.1 |
| 6,662,816 | B1 * | 12/2003 | Cunningham | 135/94 |
| 7,260,918 | B2 * | 8/2007 | Liebendorfer | 52/173.3 |
| 7,618,310 | B2 * | 11/2009 | Daniels | 454/366 |
| 7,721,492 | B2 * | 5/2010 | Plaisted et al. | 52/173.3 |
| 7,740,022 | B2 * | 6/2010 | Li | 135/87 |
| 8,595,997 | B2 * | 12/2013 | Wu | 52/173.3 |
| 2011/0023931 | A1 * | 2/2011 | Chen | 136/244 |
| 2011/0113705 | A1 * | 5/2011 | Raczkowski | 52/173.3 |
| 2012/0103377 | A1 * | 5/2012 | Sheridan | 135/91 |

* cited by examiner

*Primary Examiner* — Winnie Yip
(74) *Attorney, Agent, or Firm* — Kenyon & Kenyon LLP

(57) ABSTRACT

A shade shelter includes a frame, roller assemblies, and one or more solar panels selectively mounted on the roller assemblies so as to be movable with respect to the frame. The shade shelter may be erected over an associated structure in order to at least reduce the thermal radiation effects of the sun on the associated shelter.

19 Claims, 8 Drawing Sheets

SHADE SHELTER WITH SOLAR PANELS

CROSS-REFERENCE TO RELATED APPLICATION

The present application claims the benefit of U.S. Provisional Application No. 61/608,590, filed Mar. 8, 2012, the disclosure of which is hereby incorporated by reference.

BACKGROUND

Portable shelters are commonly used by the U.S. military and others, and are occupiable for temporarily housing military or other personnel, equipment, and/or supplies, or for providing services such as cooking, dining or medical care. Ideally, such shelters should be designed for storage in a compact configuration that can be easily transported to a new destination for assembly. Preferably, the assembly and disassembly process should be relatively quick and easy and require few hand tools.

For military and sometimes other uses, such shelters may be used in hot external environments. In that regard, some temporary shelters employ air conditioners to condition the interior space thereof. As known in the art, air conditioners are large users of power. Such power is usually generated by fuel-powered generators due to the portable nature of the shelters and the remote locations where these shelters find their primary use. Also known in the art, the fuel to operate the generators is quite expensive to purchase and/or transport in such remote locations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, an outer cover for a shade shelter is provided. The shade shelter has a support frame composed of a plurality of spaced apart frame support members. The outer cover includes a first outer cover section, a second outer cover section, and a solar panel assembly interconnected between the first and second outer cover sections. The solar panel assembly in one embodiment includes one or more frames configured to extend across at least first and second frame support members, one or more solar panels supported by the one or more frames, and first and second roller assemblies disposed in supporting relationship with respect to the one or more frames. The first and second roller assemblies are configured to be supportively coupled on the first and second frame support members, respectively, in a manner that allows the roller assemblies to roll with respect to the frame support members.

In accordance with another aspect of the present disclosure, a shade shelter is provided. The shade shelter includes a frame including a plurality of vertically aligned, spaced apart frame support members, an outer cover supported by at least a majority of the frame, wherein the outer cover includes a first outer cover section, a second outer cover section, and a solar panel assembly interconnected between the first and second outer cover sections. In some embodiments, one of the first and second outer cover section includes portions formed of solid, flexible material and at least one section of mesh to form a vent.

In accordance with another aspect of the present disclosure, a shade shelter is provided. The shade shelter includes a frame, and a solid outer cover supported by at least a majority of the frame, which together form a plurality of side walls and a roof In some embodiments, the solid outer cover includes a section of mesh positioned at or near the apex of the roof. The section of mesh acts as a vent so as to allow gas flow from the passageway to an area exteriorly of the roof of the shade shelter. The shade shelter also includes a solar panel assembly supported by a portion of the roof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides one or more examples of shade shelters suitable for reducing air conditioning loads of an associated shelter. In some embodiments, the shade shelter reduces the thermal radiation effects of the sun on the associated shelters. In other embodiments, natural convection is advantageously used to aid in reducing heat transfer into the interior space of the associated shelter. In yet other embodiments, one or more solar panels or other alternative energy sources are selectively mounted on the shade shelters in order to provide energy, for example, electricity, to components in association with the shade shelters.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
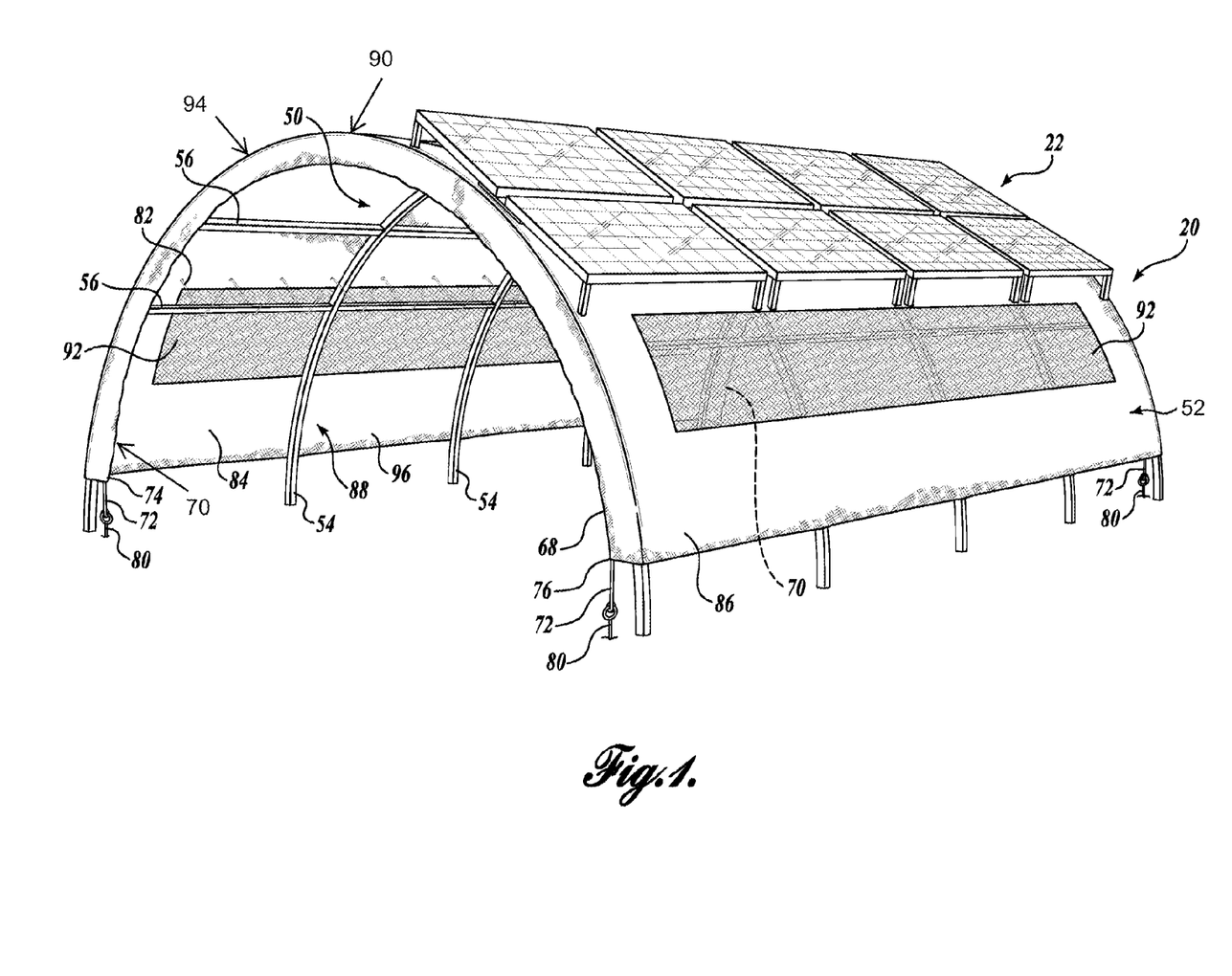
FIG. 1 is a perspective view of one example of a shade shelter in accordance with aspects of the present disclosure.

Referring now to FIG. 1, there is shown an example of a shade shelter, generally designated 20, formed in accordance with aspects of the present disclosure. As best shown in FIG. 1, the shade shelter 20 includes one or more solar panels selectively mounted thereon. In several embodiments, the shade shelter 20 is sized and configured so as form a space between an associated shelter (not shown) and the shade shelter 20 when erected over the shelter to allow airflow therein. One example of a shelter that may be associated with the shade shelter 20 is shown and described in co-pending application Ser. No. 13/294,979, filed Nov. 11, 2011, the disclosure of which is hereby incorporated by reference.

In use, as will be described in more detail below, the shade shelter 20 blocks a majority of the sun's light from hitting the associated shelter, thereby reducing the outer surface temperature of the shelter, which in turn, lowers the heat transfer into the interior space thereof. In some embodiments, as will be described in more detail below, solar panels 22 are selectively mounted on the shade shelter 20 in order to provide a source of electricity to the associated shelter. For example, the electricity may be used to power the air conditioning units, lights, etc. Electricity generated can be stored in battery banks, as dictated by its intended application.

Figure 2:
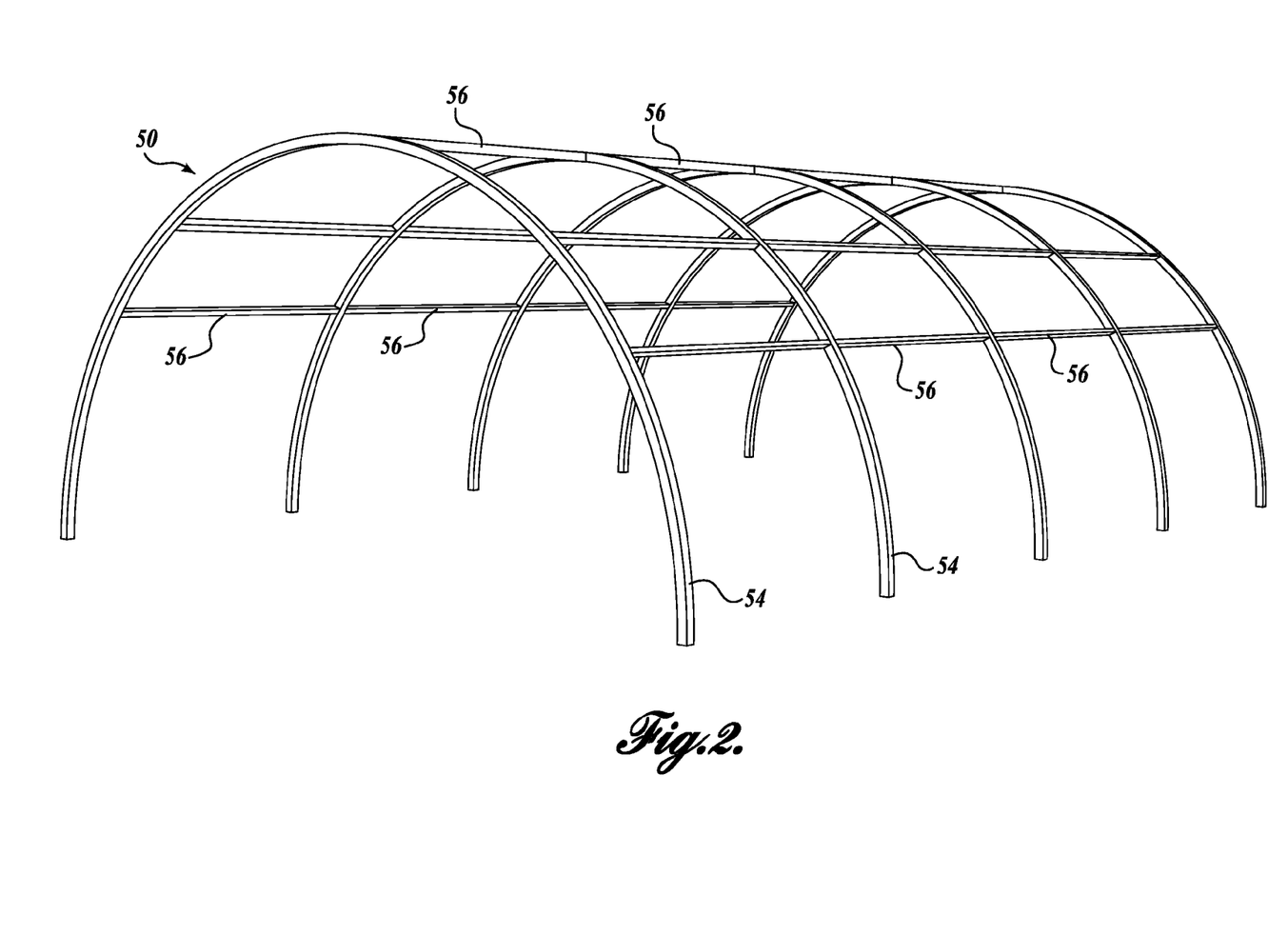
FIG. 2 is one example of a frame of the shade shelter of FIG. 1.

Referring now to FIGS. 1-2, one embodiment of the shade shelter 20 will be described in more detail. As best shown in FIGS. 1 and 2, the shade shelter 20 may comprise a frame 50 (illustrated in this embodiment as a 180 degree arched frame, although other configurations may be employed) covered with a durable and flexible outer cover 52. In one embodiment, the frame 50 can be lightweight and easy-to-assemble. As shown in FIGS. 1 and 2, the frame 50 may include a plurality of frame supports 54 supported at their opposite ends by a ground surface. The frame supports 54 extend transversely over the ground surface and can be formed, for example, of a plurality of curved components connected end-to-end. The frame supports 54 are vertically aligned, equally spaced apart, and interconnected with adjacent frame supports 54 by horizontally aligned purlins 56. In some embodiments, there are five (5) longitudinally aligned rows of purlins 30. In one embodiment, the frame supports 54 and purlins 56 are constructed out of aluminum rectangular tubing. As will be described in some detail below, some or all of the purlins can be removed in order for easier mounting of the solar panels, etc. Additionally, in some embodiments the solar panels can be selectively mounted to portions of the frame via any suitable mounting brackets, etc.

Once the frame 50 is assembled, the outer cover 52 is then disposed over the frame supports 54 so as to extend longitudinally and transversely over the frame 50, as best shown in FIG. 1. In one embodiment, contour cables 72 may be attached to the transverse edges 68 and 70 of the outer cover 52. The cables 72 can be routed through transversely extending pouches or sleeves (hidden in FIG. 1) from one respective transverse corner, such as corner 74, to the other respective transverse corner, such as corner 76. In one embodiment, the sleeve may be formed by a folded transverse edge approximately 3-6 inches in depth, and secured via heat bonding, adhesive, stitching, etc. The ends of the contour cables 72 extend outwardly of the outer cover 52 and are attached in a conventional manner to attachment members 80, such as hooks, cleats, etc., staked or otherwise affixed to the ground. In some embodiments, cables 82 may be employed to secure the aligned longitudinal sides 84 and 86 of the outer cover 52 to the purlins 56. Other attachment techniques may be employed to secure the outer cover 52 to the frame 50, including but not limited to grommets/lace, hooks, hook and loop fastening flaps, etc. If desired, optional guy lines (not shown) may be employed to hold down the outer cover 52 and/or to support the frame 50.

Still referring to FIG. 1, the outer cover 52 is of sufficient length to completely extend longitudinally over the erected frame supports 54. Also, the outer cover 52 is of sufficient width to extend transversely over the majority of the erected frame supports 54. In one embodiment, the longitudinal edges of the outer cover 52 are positioned approximately 12-60 inches above ground or other supporting surface. As erected, the frame 50 and outer cover 52 may form an open ended shade shelter having side walls and a roof. In the embodiment shown, the side walls and the roof are contiguously curved so as to form a 180 degree arch.

The outer cover 52 in one embodiment is made of one or more layers of solid and/or low or non gas permeable material such as a polyester reinforced vinyl fabric, military grade canvas fabrics, nylon fabrics, Cordura® fabrics, military spec. 44103D fabrics, etc. The outer cover 52 includes one or more semi-permeable areas positioned in various locations of the outer cover 52. In that regard, the outer cover 52 in several embodiments includes one or more longitudinally extending areas 92 of mesh, such as vinyl mesh fabric, vinyl coated mesh, nylon mesh, military grade mesh fabric, wire mesh, etc., positioned at or near the crest or apex 90 of the roof of the shade shelter 20. The interstices of the longitudinally extending areas 92 of mesh are sized and configured so as to permit air flow through the outer cover 52, and in some embodiments, the interstices may be of a diamond configuration, hexagonal configuration, rectangular configuration, etc., just to name a few. As will be described in more detail below, the areas 92 may act like a vent to allow hot, rising air to escape through the shade shelter from the space 26, which may in turn, pull cooler air from the bottom of the longitudinal sides and ends of the shade shelter, thereby creating convection sometimes referred to as a chimney effect.

In other embodiments, the outer cover 52 also includes one or more longitudinally extending areas 92 of mesh, such as vinyl mesh fabric, vinyl coated mesh, nylon mesh, military grade mesh fabric, wire mesh, etc., positioned on the sides 84 and 86 of the outer cover 52 at approximately the height of the windows of the associated shelter. In some embodiments, the interstices of the longitudinally extending areas 92 of mesh are sized and configured so as to provide visibility to the occupants of the shelter 24 so that the occupants may see through the windows and out through the outer cover 52. Additionally or alternatively, the interstices of the longitudinally extending areas 92 of mesh are sized and configured so as to permit air flow through the outer cover 52. In some embodiments, the interstices may be of a diamond configuration, hexagonal configuration, rectangular configuration, etc., just to name a few.

In several embodiments, the semi-permeable areas, including longitudinally extending areas 92, provide between approximately 55-90 % solar protection from the sun's rays. In one embodiment, the longitudinally extending areas 92 provide approximately 85 % solar protection from the sun's rays. In these or other embodiments, an optional blackout layer 96 may be attached along the interior surface of the outer cover 52 other than in the semi-permeable areas, which solely, or in combination with the outer cover 52, aid in the prevention of light emission into the interior of the shade shelter. In one embodiment, the blackout layer 96 is chosen so that the outer cover 52 provides greater than 80 % and up to 100 % solar protection from the sun's rays. One or more materials that can be employed in the blackout layer include but are not limited to carbon, carbon blends, etc. The outer cover 52 may have a camouflaged exterior color that matches the environment, if desired.

Figure 3:
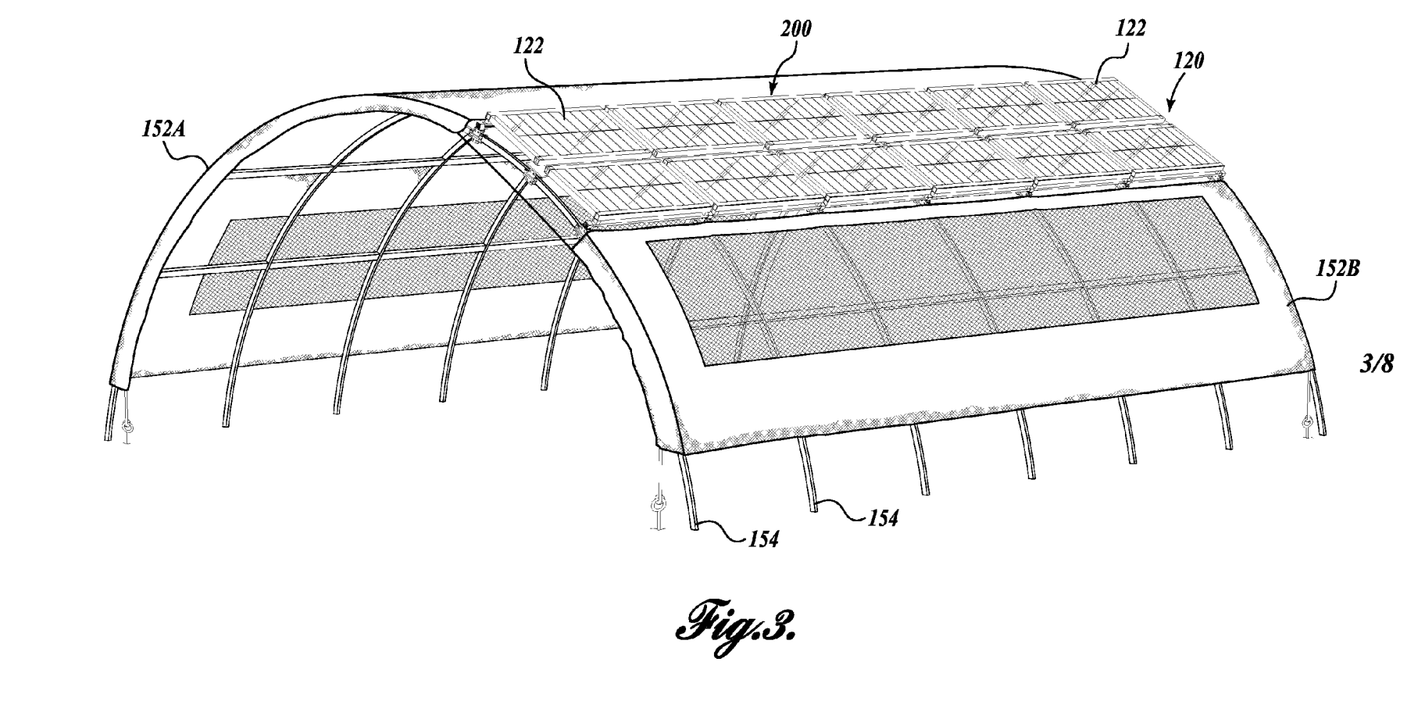
FIG. 3 is another example of a shade shelter in accordance with aspects of the present disclosure.
Figure 4:
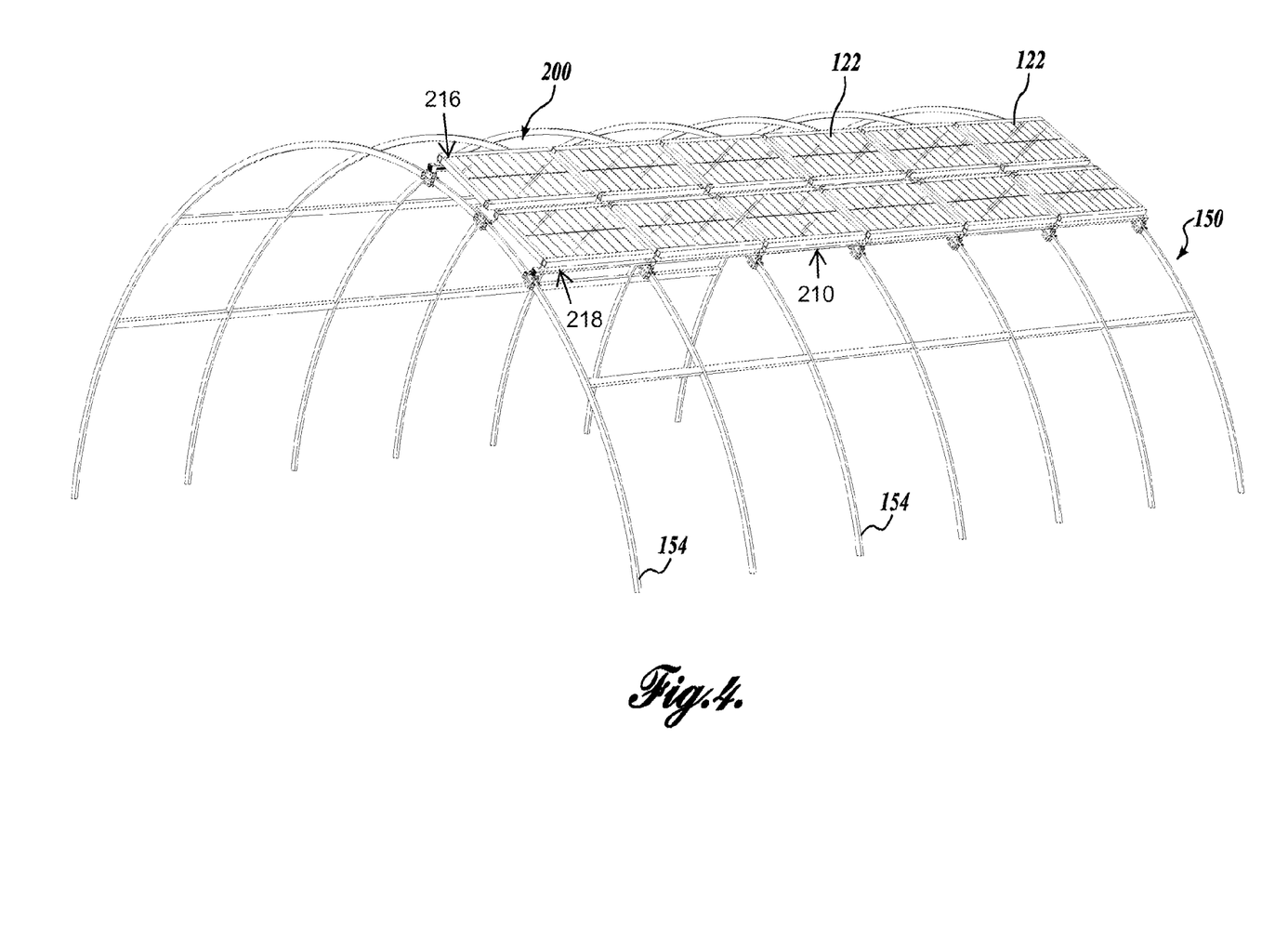
FIG. 4 is one example of a frame of the shade shelter of FIG. 3 with a solar panel assembly disposed thereon.

Turning now to FIG. 3, there is shown another embodiment of the shade shelter 120 constructed in accordance with aspects of the present disclosure. The shade shelter 120 is substantially similar in construction and materials as the shade shelter 20 of FIG. 1 except for the differences that will now be described in detail. As can be shown in FIG. 3, the solar panels 122, when mounted, can be positioned so as to replace a section of the outer cover 152. In that regard, the outer cover 152 can be constructed in two separate sections 152A and 152B, and can be erected on the frame 150 along with the solar panels 122. In one embodiment, the outer cover sections 152A and 152B can be selectively coupled on opposite sides of the solar panels in any suitable manner. In some embodiments, the longitudinal edges of opposing sides of the outer cover sections 152A and 152B may include grommets, eyelets, or other suitable structure for coupling with cooperating structure of the solar panels. In other embodiments, snap fasteners, hook and loop fasteners, zippers, etc., may be employed to selectively couple the longitudinal sides of the outer cover sections 152A and 152B to the solar panels.

The solar panels 122 in the embodiment shown are part of a solar panel assembly 200, comprising a plurality of solar panels 122, a solar panel frame 206 for each solar panel 122, mounting plates 208 and base frames 210. In the embodiment shown in FIGS. 3 and 5, the solar panel frames 206 are generally rectangular in shape and are configured to retain respective solar panels 122 in a supporting manner. At the corners of the each solar panel frame 206, there are formed square apertures 212 for receiving cooperating mounting posts 220A of the base frames 210 or mounting posts 220B of the mounting plates 208.

Figure 5:
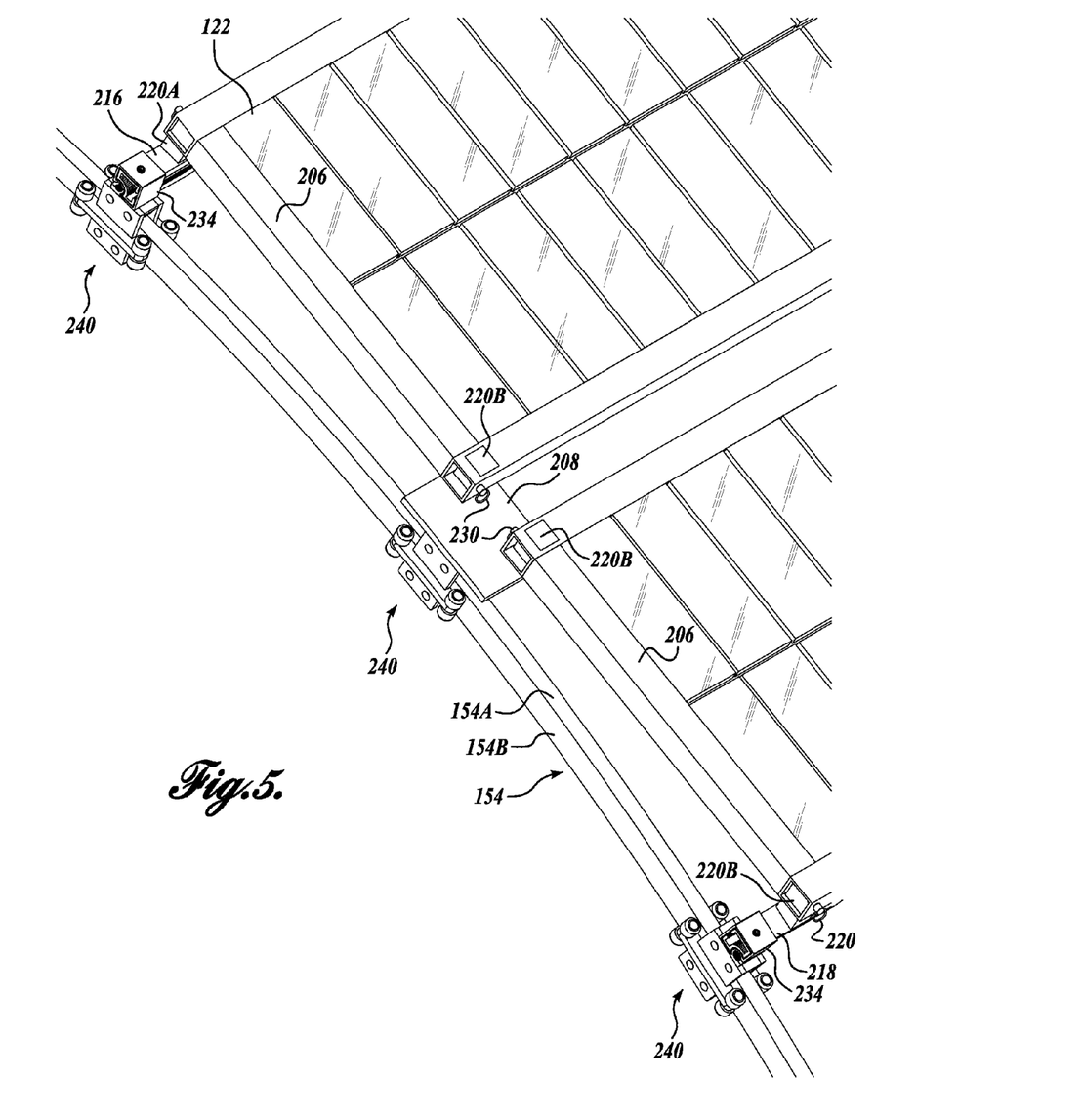
FIG. 5 is a partial, enlarged view of FIG. 4 showing the solar panel assembly disposed on the frame.
Figure 6:
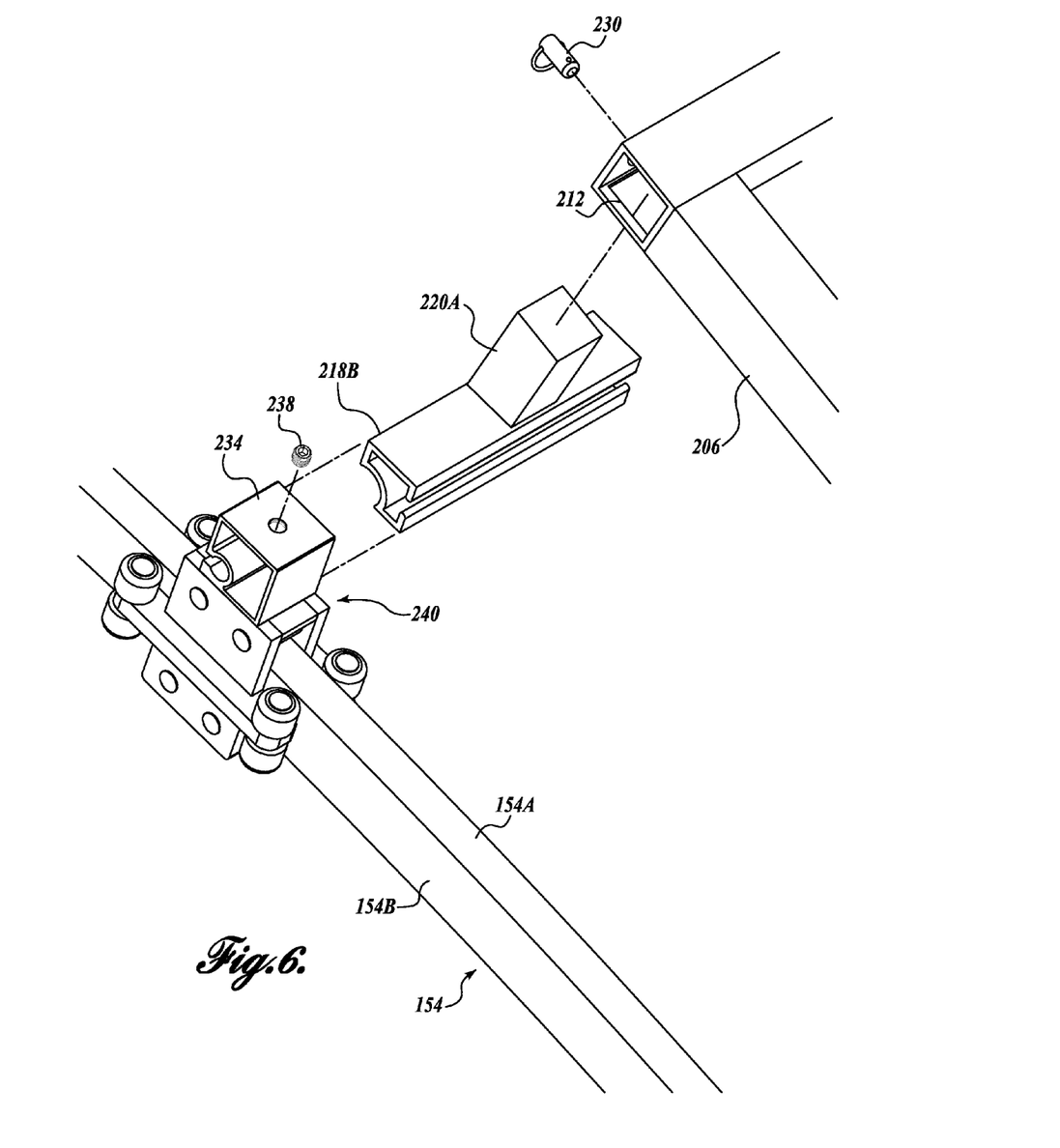
FIG. 6 is a partial, exploded view of one section of FIG. 4.

Referring to FIGS. 5 and 6, the base frame 210 includes top and bottom longitudinally extending frame members 216 and 218. In one embodiment, the longitudinally extending frame members 216 and 218 can be configured to be selectively coupled to the longitudinal sides of the outer cover sections 152A and 152B, respectively. Mounting posts 220A extend perpendicularly from the frame members 216 and 218 at longitudinally spaced apart locations. The outward ends of the mounting posts 220A are configured to be received in the square apertures 212 of the solar panel frame 206 in order to support the outwardly disposed longitudinal sides of the solar panels. Locking pins 230, bolts, and/or other suitable fasteners can be used to selectively secure the solar panel frames 206 to the frame members 216 and 218. At the inwardly disposed longitudinal sides of the solar panel frames 206 are mounting plates 208. The mounting plates 208 include mounting posts 220B configured to be received by the square apertures 212 of the solar panel frame 206, as best shown in FIG. 5. As such, the mounting plates 208 support the inwardly disposed longitudinal sides of the panels 122. Again, locking pins 230, bolts, and/or other suitable fasteners can be used to selectively secure the solar panel frames 206 to the mounting plates 208.

Figure 7:
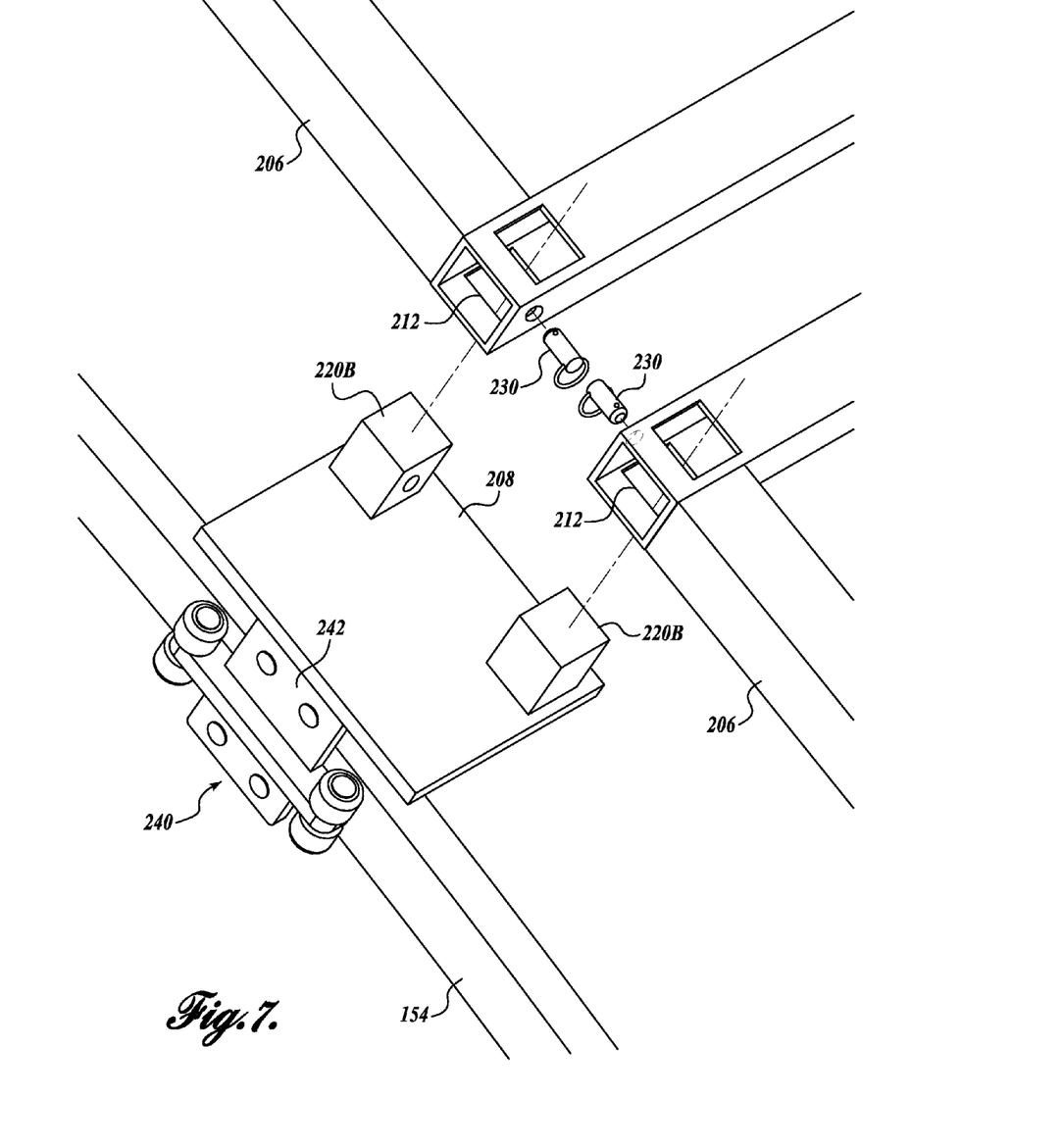
FIG. 7 is a partial, exploded view of another section of FIG. 4.

Roller assemblies 240 are mounted to both the underside (side opposite the solar panels) of the mounting plates 208 and to the frame members 216 and 218 at spaced apart locations corresponding to the frame supports 154, as best shown in FIGS. 5-7. As best shown in FIGS. 5 and 6, the roller assemblies 240 can be mounted to the frame members 216 and 218 via retaining collars 234. The retaining collars 234 are fixedly mounted to the top of the roller assemblies 240, and are configured to receive the frame members 216 and 218 therein. Again, locking pins 238, bolts, and/or other suitable fasteners can be used to selectively secure the frame members 216 and 218 to the retaining collars 234. In one embodiment, the roller assemblies 240 associated with the longitudinally extending frame members 216 and 218 can be configured to be selectively coupled to the longitudinal sides of the outer cover sections 152A and 152B, respectively. Referring to FIG. 7, the roller assemblies 240 can be mounted to the base frame 210 directly or indirectly via any suitable fastener, welding, and/or the like.

Figure 8:
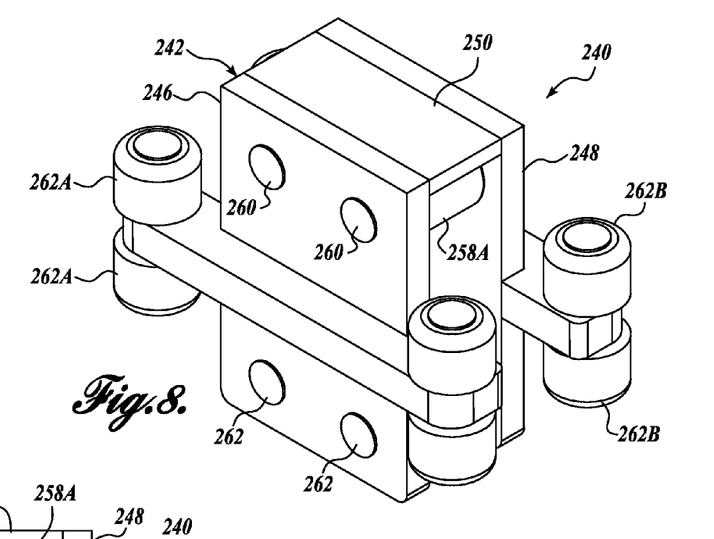
FIGS. 8-10 depict one example of the roller assembly formed in accordance with aspects of the present disclosure.
Figure 9:
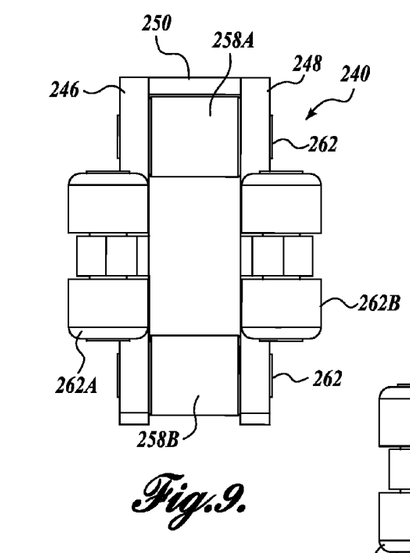
Figure 10:
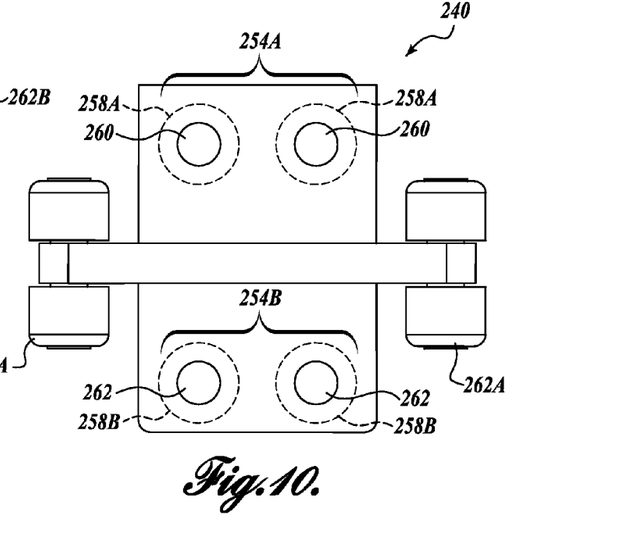

FIGS. 8-10 illustrate one example of the roller assembly 240 that may be practiced with embodiments of the present disclosure. As best shown in FIGS. 8-10, the roller assembly 240 includes a generally U-shaped bracket 242 with first and second side plates 246 and 248 interconnected at the top via top plate 250. The top plate 250 is configured to be secured to the retaining collar 234 or mounting plate 208. The roller assembly 240 also includes a first set 254A of rollers 258A, which are journaled for rotation between the opposing side plates of the U-shaped bracket about fixed axles 260. The first set 254A of rollers 258A are configured and arranged to roll against the top surface 154A of the frame supports 154 when the roller assembly 240 is supported thereon (See FIGS. 6 and 7).

The roller assembly 240 may optionally include a second set 254B of rollers 258B, which can be selectively coupled between the opposing sides 246, 248 of the U-shaped bracket via removable axles 262. The second set 254B of rollers 258B are disposed at the free ends of the side plates 246 and 248 and spaced apart from the first set 254A of rollers 258A. The second set 254B of rollers 258B are configured and arranged to contact the bottom of the frame supports 154 when coupled thereto, and also function to retain the roller assemblies on the frame supports 154 when mounted thereto. To mount the roller assembly 240 onto the frame support 154, the second set 254B of rollers 258B can be removed by pulling out removable axles 262 via loops (not shown). The u-shaped bracket is then brought down over the frame support 154 so that the first set 254A of rollers 258A contacts the top surface 154A thereof. The second set 254B of rollers 258B can then be reattached to the bracket 242 below the frame support 154.

The roller assembly 240 further includes first and second sets of rollers 262A and 262B spaced apart and supported for rotation via side plates 246 and 248, respectively. The first set of rollers 262A rotate about axes perpendicular to the first set 254A of rollers 258A, and are grouped in some embodiments as aligned pairs on either side of side plate 246. Similarly, the second set of rollers 262B rotate about axes perpendicular to the first set 254A of rollers 258A and parallel to the first set of rollers 262A. The second set of rollers 262B are grouped in some embodiments as aligned pairs on either side of side plate 248. As best shown in FIGS. 5 and 7, the first and second sets of rollers 262A and 262B are configured and positioned so as to roll along the outer side surface 154B and inner side surface 154B (hidden in FIG. 7) of frame supports 154, respectively.

To assembly the shade shelter 120, the frame 150 is first erected. Once erected, the solar panel assembly 200 is mounted to the frame via roller assemblies 240. In that regard, the roller assemblies 240 are selectively mounted to respective frame supports 154 as briefly described above. Once the wheel assemblies 240 are engaged with respective frame supports 154, the outer cover 150, with the solar panel assembly 200 connected in-between the outer cover sections 152A and 152B, can then be hoisted up and over the frame 150 of the shade shelter 120 via an automated pulling device or can be manually pulled into place via cables and hand-cranks and/or pulley arrangements, etc. As such, the outer cover 152 and solar panel assembly 200, via the roller assemblies 240, is pulled along the frame supports 154 until achieving a desired position. Once in position, lock pins or other devices can selectively fix the assembly 200 in place. In one embodiment, the solar panels 122 are oriented at about a 30 degree angle when fixed in place on the shade shelter 120. It will be appreciated that some purlins can be removed in order to assembly the outer cover onto the frame. Once the outer cover is in place, the purlins can then be reattached.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An outer cover for a shade shelter having a support frame composed of a plurality of spaced apart frame support members, the outer cover comprising:
 a first outer cover section;
 a second outer cover section; and
 a solar panel assembly interconnected between the first and second outer cover sections, wherein the solar panel assembly includes:
  one or more frames configured to extend across at least first and second frame support members;
  one or more solar panels supported by the one or more frames;
  first and second roller assemblies disposed in supporting relationship with respect to the one or more frames, wherein the first and second roller assemblies are configured to be supportively coupled on the first and second frame support members, respectively, in a manner that allows the roller assemblies to roll with respect to the frame support members.

2. The outer cover of claim 1, wherein each roller assembly includes at least one first roller configured to contact a top surface of the respective frame support member, the first roller having a first axis of rotation.

3. The outer cover of claim 2, wherein each roller assembly includes at least one second roller configured to contact a bottom surface of the respective frame support member, the second roller having a second axis of rotation that is parallel with the first axis of rotation.

4. The outer cover of claim 3, wherein the at least one second roller is configured to be selectively removable from the roller assembly.

5. The outer cover of claim 2, wherein each roller assembly includes at least one third roller configured to contact one side of the respective frame support member, the third roller having a third axis of rotation that is perpendicular with the first axis of rotation.

6. The outer cover of claim 5, wherein the at least one third roller includes a pair of spaced apart third rollers.

7. The outer cover of claim 5, wherein each roller assembly includes at least one fourth roller configured to contact a side of the respective frame support member opposite the side contacting the third roller, the fourth roller having a fourth axis of rotation that is parallel with the third axis of rotation.

8. The outer cover of claim 7, wherein the at least one fourth roller includes a pair of spaced apart fourth rollers.

9. The outer cover of claim 1, wherein at least one of the first and second outer cover sections includes a vent disposed therethrough.

10. A shade shelter, comprising:
 a frame including a plurality of vertically aligned, spaced apart frame support members;
 first and second roller assemblies;
 an outer cover supported by at least a majority of the frame, wherein the outer cover includes a first outer cover section, a second outer cover section;
 a solar panel assembly connecting the first and second outer cover sections, one of the first and second outer cover sections including portions formed of solid, flexible material and at least one section of mesh, wherein the at least one section of the mesh forms a vent; the solar panel assembly being supported on two or more of the frame support members via the first and second roller assemblies.

11. The shade shelter of claim 10, wherein the vent is located at or near an apex of a roof of the shade shelter.

12. The shade shelter of claim 11, wherein the outer cover, when supported by the frame, defines a plurality of solid side walls, and makes the roof solid.

13. The shade shelter of claim 10, wherein each of the first and second roller assemblies includes:
 at least one first roller configured to contact a top surface of the respective frame support member, the first roller having a first axis of rotation; and
 at least one second roller configured to contact one side of the respective frame support member, the second roller having a second axis of rotation that is perpendicular with the first axis of rotation.

14. The shade shelter of claim 10, wherein the solar panel assembly includes one or more solar panels supported by one or more solar panel frames.

15. The shade shelter of claim 14, wherein the one or more solar panel frames are movably supported on two or more frame support members via first and second roller assemblies in a manner that allows the roller assemblies to roll with respect to the frame support members.

16. A shade shelter, comprising:
 a frame including a plurality of frame support members;
 first and second roller assemblies which roll with respect to the frame support members;
 a solid outer cover supported by at least a majority of the frame, which together form a plurality of side walls and a roof; and
 a solar panel assembly mounted over the roof and movably supported on two or more of the frame support members by the first and second roller assemblies.

17. The shade shelter of claim 16, wherein the frame support members are vertically aligned and spaced apart frame support members, and wherein the solar panel assembly is supported by at least two of the frame support members.

18. The shade shelter of claim 16, wherein each of the first and second roller assemblies includes:
 a pair of first rollers configured to contact a top surface of the respective frame support member; and
 a pair of second rollers oriented perpendicular to the pair of first rollers, wherein the pair of second roller are configured to contact one side of the respective frame support member.

19. The shade shelter of claim 16, wherein the solid outer cover includes a section of mesh positioned at or near an apex of the roof, the section of mesh acting as a vent so as to allow gas flow from an inside to an outside of the roof of the shade shelter.

* * * * *